United States Patent
Gold et al.

(10) Patent No.: US 10,131,584 B2
(45) Date of Patent: Nov. 20, 2018

(54) FERTILIZER COMPOSITIONS INCLUDING WOOL PELLETS AND ANIMAL PRODUCTS, WOOL PELLETS INCLUDING ANIMAL PRODUCTS, AND RELATED METHODS

(71) Applicants: Brian D. Gold, West Haven, UT (US); Mark S. Gold, Farmington, UT (US); Albert R. Wilde, Croydon, UT (US)

(72) Inventors: Brian D. Gold, West Haven, UT (US); Mark S. Gold, Farmington, UT (US); Albert R. Wilde, Croydon, UT (US)

(*) Notice: Subject to any disclaimer, the term of this patent is extended or adjusted under 35 U.S.C. 154(b) by 111 days.

(21) Appl. No.: 15/235,602

(22) Filed: Aug. 12, 2016

(65) Prior Publication Data
US 2017/0144944 A1    May 25, 2017

Related U.S. Application Data

(63) Continuation-in-part of application No. 14/952,475, filed on Nov. 25, 2015.

(51) Int. Cl.
*C05G 3/00*   (2006.01)
*C05F 1/00*   (2006.01)
(Continued)

(52) U.S. Cl.
CPC .............. *C05F 1/005* (2013.01); *A01N 63/02* (2013.01); *C05B 17/00* (2013.01); *C05F 1/002* (2013.01);
(Continued)

(58) Field of Classification Search
CPC .......... C05F 1/005; C05F 1/002; C05B 17/00; C05C 11/00; C05D 1/00; C05G 3/0058;
(Continued)

(56) References Cited

U.S. PATENT DOCUMENTS 1,945,229 A    1/1934   Watters
2,143,468 A    1/1939   Avery
(Continued)

FOREIGN PATENT DOCUMENTS

DE    202007002569 U1    6/2007
GB       2317886 A       4/1998
(Continued)

OTHER PUBLICATIONS

Ross Penhallegon, Nitrogen-Phosphorus-Potassium Values of Organic Fertilizers. OSU/Lane County Extension Horticulture Agent; edited by Karen Ailor May 2003 pp. 1-4 <http://extension.oregonstate.edu/lane/sites/default/files/documents/lc437organicfertilizersvaluesrev.pdf>.*

(Continued)

*Primary Examiner* — Jennifer A Smith
(74) *Attorney, Agent, or Firm* — TraskBritt

(57) ABSTRACT

A fertilizer composition comprising a base composition, a plurality of wool pellets comprising wool, and at least one animal product selected from the group consisting of blood meal, meat and bone meal, fish meal, and tankage. Related methods of forming the fertilizer composition comprise providing a plurality of wool pellets to a base composition, adding the at least one animal product to the base composition, and mixing the plurality of wool pellets, the at least one animal product, and the base composition to form a fertilizer composition comprising the plurality of wool pellets, the at least one animal product, and the base composition. Related methods of providing at least one nutrient to a plant are also described.

16 Claims, 7 Drawing Sheets

(51) Int. Cl.
*C05G 3/02* (2006.01)
*C05B 17/00* (2006.01)
*A01N 63/02* (2006.01)

(52) U.S. Cl.
CPC ............. *C05G 3/00* (2013.01); *C05G 3/0058* (2013.01); *C05G 3/02* (2013.01); *Y02A 40/202* (2018.01); *Y02A 40/203* (2018.01); *Y02P 20/145* (2015.11)

(58) Field of Classification Search
CPC . C05G 3/02; C05G 3/00; C05G 3/005; A01N 63/00
See application file for complete search history.

(56) References Cited

U.S. PATENT DOCUMENTS

| | | | |
|---|---|---|---|
| 2,640,772 | A | 6/1953 | Morris |
| 5,021,077 | A * | 6/1991 | Moore .................. C05F 1/00 426/285 |
| 8,813,423 | B2 | 8/2014 | Harriman et al. |
| 2004/0050126 | A1 | 3/2004 | Green |
| 2006/0107589 | A1 * | 5/2006 | Rubin .................. A01G 31/001 47/59 S |
| 2007/0163316 | A1 | 7/2007 | Fedkenheuer et al. |
| 2011/0023566 | A1 | 2/2011 | Lodwig et al. |
| 2012/0103039 | A1 | 5/2012 | Bracher |
| 2014/0235438 | A1 | 8/2014 | Thompson et al. |
| 2015/0047402 | A1 | 2/2015 | Walker et al. |
| 2015/0101378 | A1 | 4/2015 | Ogle et al. |
| 2015/0152017 | A1 | 6/2015 | Schumski et al. |

FOREIGN PATENT DOCUMENTS

| | | |
|---|---|---|
| WO | 02089968 A2 | 11/2002 |
| WO | 2008029075 A1 | 3/2008 |

OTHER PUBLICATIONS

Lo Nostro et al. "Water absorbency by wool fibers: Hofmeister effect."Biomacromolecules 3.6 (2002): 1217-1224.
Standard Wool. "American farmer develops new use for unused wool" Standard Wool News pp. 1-4 (2016) <http://www.standardwoolnews.co.uk/2016/08/04/american-farmer-develops-new-use-unused-wool/>.
WulPak, www.hortifeeds.co.uk, 2 pages, accessed on Nov. 3, 2015.
U.S. Appl. No. 14/952,475, filed Nov. 25, 2015, to Gold et al., titled Wool Pellets for Plant Fertilization and Related Methods, 27 pages.
U.S. Appl. No. 14/952,509, filed Nov. 25, 2015, to Gold et al., titled Wood Pellets for Water Retention With Plants and Related Methods, 29 pages.
floraPell Der okologische Langzeitdunger Informaton <http://www.florapell.de/english/information/> pp. 1-2 (Nov. 11, 2014).
Off the Grid News "5 Important Reasons You Should Add Llamas to Your Livestock Herd" <http://www.offthegridnews.com/howto-2/1 0-steps-to-off-grid-living-today/3/> pp. 1-3 (2015).
Senay design Studio "Natural Fibers" <https://www.senaystudio.com/pages/naturalfibers> pp. 1-4 (2017).
Topys Farms "Unusual Uses for Wool" <http://topsyfarms.com/wool-wellbeing/unusual-uses-for-wool> pp. 1-4 (2013.

* cited by examiner

FERTILIZER COMPOSITIONS INCLUDING WOOL PELLETS AND ANIMAL PRODUCTS, WOOL PELLETS INCLUDING ANIMAL PRODUCTS, AND RELATED METHODS

CROSS-REFERENCE TO RELATED APPLICATION

This application is a continuation-in-part of U.S. patent application Ser. No. 14/952,475, filed Nov. 25, 2015, the disclosure of which is hereby incorporated herein in its entirety by this reference.

TECHNICAL FIELD

This disclosure relates generally to fertilizer compositions including wool pellets comprising animal wool and animal products, to methods of making such fertilizer compositions, and to methods of using the fertilizer compositions to provide nutrients and water to plants.

BACKGROUND

To qualify as organic, foods have to be grown under strict guidelines provided by the United States Department of Agriculture ("USDA"). The recent push by consumers for more naturally grown or organic food has caused farmers to change fertilization and watering methods in an effort to provide food that qualifies as organic under the USDA guidelines. However, fertilizers that can be used to grow such organic foods are limited, and in most cases, do not provide a consistent source of nutrients to the soil in which they are located. In addition, regulations defining fertilizers that classify as organic are increasingly stringent. With the lack of organic fertilizers, organic crops are often smaller, less healthy, and less profitable. Additionally, farmers and other growers cannot reliably plan on a quantity or quality of crop without adequate organic fertilizers. Furthermore, since regulations do not allow for conventional pesticides for organic crops, organic crops are more costly to grow and produce.

BRIEF SUMMARY

Some embodiments of the present disclosure include a fertilizer composition comprising at least one animal product and wool. For example, in one embodiment, a fertilizer composition comprises a base composition, a plurality of pellets comprising wool, and at least one animal product selected from the group consisting of blood meal, meat and bone meal, fish meal, and tankage.

In other embodiments, a method of forming a fertilizer composition comprises providing a plurality of wool pellets to a base composition, adding at least one animal product selected from the group consisting of blood meal, meat and bone meal, fish meal, and tankage to the base composition, and mixing the plurality of wool pellets, the at least one animal product, and the base composition to form a fertilizer composition comprising the plurality of wool pellets, the at least one animal product, and the base composition.

In another embodiment, a method of providing at least one nutrient to a plant comprises distributing a fertilizer composition through a soil composition located proximate roots of the plant, the fertilizer composition comprising a plurality of wool pellets and at least one animal product selected from the group consisting of blood meal, meat and bone meal, fish meal, and tankage. The method further comprises adding water to the soil composition and responsive to exposure to the water, releasing at least one nutrient from the plurality of wool pellets and at least one nutrient from the at least one animal product to the soil composition.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
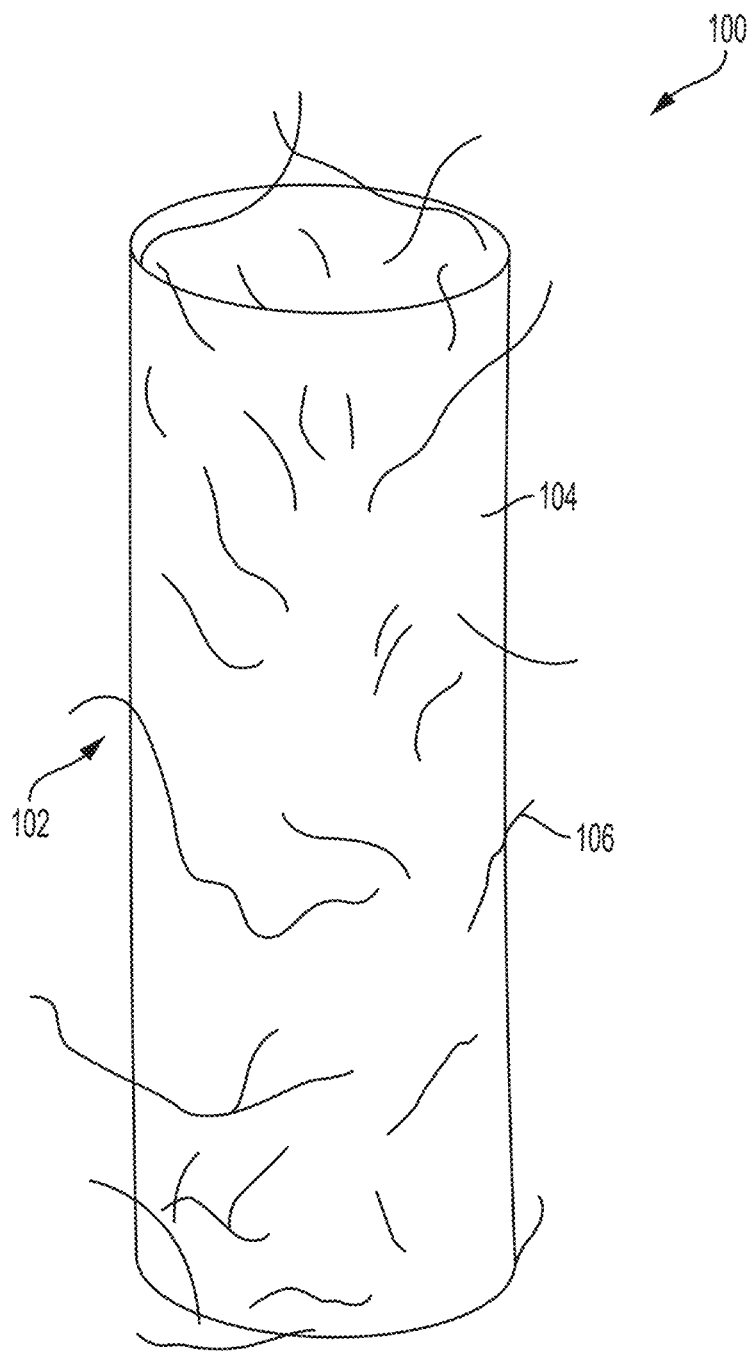
FIG. 1 is a perspective view of a wool pellet, according to an embodiment of the present disclosure.

The illustrations presented herein are not actual views of any particular wool pellet, or any component thereof, but are merely idealized representations, which are employed to describe the present invention.

As used herein, any relational term, such as "first," "second," "top," "bottom," "beneath," etc., is used for clarity and convenience in understanding the disclosure and accompanying drawings, and does not connote or depend on any specific preference or order, except where the context clearly indicates otherwise.

As used herein, the term "wool" means and includes any type of animal hair, fiber, fur, silk, feathers, or any form of animal skin or hide.

As used herein, the term "tankage" means and includes dried animal residues and may include animal waste including animal blood, animal fat, meat scraps, animal carcasses, animal bones (e.g., crushed animal bonds), or other parts of animals.

Some embodiments of the present disclosure include fertilizer compositions including pellets comprising wool (also referred to herein as "wool pellets") and at least one animal product selected from the group consisting of blood meal, meat and bone meal, fish meal, and tankage. The pellets may comprise wool and the at least one animal product and may be provided in the fertilizer composition. In other embodiments, the animal product is provided to the fertilizer composition separate from the pellets. The fertilizer composition may be used for growing plants in a pot or may be disposed and mixed in a soil composition proximate roots of a plant (such as in a garden). The pellets may be configured to provide nutrients and water to the soil composition. The animal product may be formulated to provide nutrients to the soil composition. The wool pellets and animal product, in combination, may provide nutrients to the soil composition and to the roots of plants in or proximate to the soil composition in which the fertilizer composition is mixed. In some embodiments, the wool pellets and the animal product may provide different amounts of different nutrients to the soil composition at different times. In some embodiments, the animal product may provide nutrients required by a plant at initial growth stages (e.g., when a plant seed germinates until about 8 to 12 weeks). The animal product may be formulated and configured in the fertilizer composition to provide additional nutrients to the fertilizer composition or the soil composition when a plant is larger and requires additional nutrients, such as after the plant is older than about 8 weeks from germination.

In some embodiments, the pellets and the fertilizer composition may be organic. As used herein, the term "organic" and any derivative terms means that the methods or products (e.g., pellets) qualify for designation as "Certified Organic," as defined under the United States Department of Agriculture organic regulations as of Aug. 12, 2016 (hereinafter "USDA organic regulations").

Some embodiments described herein include methods of providing nutrients to plants (e.g., trees, shrubs, vegetables, bushes, etc.) using fertilizer compositions. For example, the fertilizer composition, the pellets, or both may be distributed throughout a soil composition in which a plant is growing. The wool of the pellets may begin to decompose and provide nutrients, such as, for example, nitrogen, to the plant growing in the soil composition. At least one animal product in one or more of the pellets or distributed throughout the fertilizer composition may provide nutrients to the soil composition. The animal product may exhibit a nutrient delivery curve that is different than a nutrient delivery curve of the wool pellets. Accordingly, the wool pellets may deliver nutrients to the soil composition and to the roots of a plant at different rates and amounts than the animal product. A relative amount of the animal product to the wool pellets in the fertilizer composition may be tailored to achieve a desired nutrient delivery curve of the fertilizer composition and provide a desired amount of nutrients to the soil composition. In some embodiments, plants grown with the methods for providing nutrients to plants may qualify as organic as defined above.

FIG. 1 illustrates a pellet 100 for use in horticultural practices according to an embodiment of the present disclosure. The pellet 100 (referred to herein as "pellet," "pellets," or "wool pellets") may include wool 102 from one or more types (genera) of mammals. The wool 102 may comprise a plurality of fibers 106 that may be bound together with a binding agent 104.

In some embodiments, the wool 102 comprises sheep wool. In some embodiments, the wool 102 may include belly wool from a sheep (i.e., wool 102 from a belly area of a sheep), wool from a back end of the sheep (often referred to in the art at "tag wool"), or a combination thereof. In other embodiments, the wool 102 may comprise wool taken from any location of the sheep's body. In other embodiments, the pellet 100 may include wool 102 from one or more of a sheep, goat, llama, alpaca, camel, or other wool-bearing mammals. In some embodiments, the wool 102 comprises hypoallergenic wool.

The wool 102 may comprise natural, unprocessed wool 102. For example, the wool 102 may include virgin wool, as understood by those skilled in the art. As used herein, the phrase "virgin wool" may refer to wool that has been spun for the first time. In other words, the phrase "virgin wool" does not refer to shoddy or recycled wool, which is made by cutting or tearing apart existing wool fabric and re-spinning the fibers. Furthermore, the wool 102 may not be chemically treated after removing the wool 102 from an animal and prior to forming the wool 102 into pellets 100. For example, the wool 102 may not be treated with solvents, stripping agents, or detergents. As a result, the wool 102 may retain its natural lanolin (e.g., wool wax or wool grease). In other words, lanolin may not be removed from the wool 102 (i.e., lanolin in the wool 102 may be maintained). As described in further detail below, the lanolin in the wool 102 may provide a natural lubrication and/or binder when the wool 102 is pelletized. Furthermore, keeping the lanolin in the wool 102 may provide the pellets 100 with antibacterial and antifungal properties. As a result, the pellet 100 may be mildew-resistant and may help to prevent diseases in plants where the pellet 100 is used as a fertilizer. In addition, the lack of treatment with solvents, stripping agents, or detergents may qualify the pellets 100 including the untreated wool 102 as organic. In some embodiments, the wool comprises urine, fecal matter, or both from the animal from which it is obtained. It is believed that the urine, fecal matter, or both provide an initial amount of nutrients to the fertilizer composition while the wool decomposes and while the at least one animal product solubilizes in the fertilizer composition.

In some embodiments, the pellets 100 may include a binding agent 104. The binding agent 104 may bind fibers 106 of the wool 102 together and maintain a shape of the pellet 100. The binding agent 104 may include one or more of sawdust, grain, coir (i.e., natural fiber from husk of a coconut), wood, wood fiber, at least one animal product (e.g., blood meal, meat and bone meal (MBM), fish meal, tankage), animal manures (e.g., bovine manure, poultry manure, etc.), copper sulfate ($CuSO_4$, $CuSO_4.5H_2O$) or any other known natural binding agents. In some embodiments, the pellets 100 may not include a binding agent 104, and the pellets 100 may be at least substantially entirely made from wool 102. When the pellets 100 are made of at least substantially entirely wool 102, the fibers 106 of the wool 102 may naturally bind together through mechanical interference (e.g., tangling) of the fibers 106 due to natural binding agents 104, such as lanolin. Furthermore, the fibers 106 may naturally bind together as the wool 102 is compressed during pelletizing processes.

In some embodiments, the binding agent 104 comprises at least one animal product, such as blood meal, meat and bone meal, fish meal, or tankage. In some such embodiments, the binding agent 104 may be substantially uniformly dispersed throughout the pellet 100. The animal product may be configured to deliver one or more desired nutrients to the fertilizer composition proximate the pellet 100.

The animal product may include blood meal comprising dried animal blood that is organic. Blood meal may include blood from one or more bovine animals (e.g., cattle), poultry (e.g., chicken, turkey, etc.), swine (e.g., porcine), sheep, fish, or other animal. In some embodiments, the blood meal comprises dried bovine blood.

The animal product may comprise a powder that is high in nitrogen. The animal product may comprise between about 9 weight percent and about 15 weight percent nitrogen, such as between about 9 weight percent and about 11 weight percent, between about 11 weight percent and about 13 weight percent, or between about 13 weight percent and about 15 weight percent nitrogen. In some embodiments, the animal product comprises about 13.25 weight percent nitrogen. The animal product may comprise between about 0.5 weight percent and about 2.0 weight percent phosphorus, such as between about 0.5 weight percent and about 1.0 weight percent, or between about 1.0 weight percent and about 2.0 weight percent phosphorus. In some embodiments, the animal product comprises about 1.0 weight percent phosphorus. The animal product may comprise between about 0.25 weight percent and about 1.0 weight percent potassium, such as between about 0.25 weight percent and about 0.50 weight percent, between about 0.50 weight percent and about 0.75 weight percent, or between about 0.75 weight percent and about 1.0 weight percent potassium. In some embodiments, the animal product comprises about 0.6 weight percent potassium.

The animal product may comprise a powder including particles having a generally spherical shape. In some embodiments, a mean diameter of the particles may be between about 1 μm and about 1000 μm, such as between about 1 μm and about 100 μm, between about 100 μm and about 500 μm, or between about 500 μm and about 1000 μm. It is believed that the relatively small diameter of the particles of the animal product increases an exposed surface area of the animal product, which facilitates distribution of nutrients therefrom into the fertilizer composition and a surrounding soil composition.

The animal product may constitute between about 1 weight percent and about 50 weight percent of the pellet 100, such as between about 1 weight percent and about 5 weight percent, between about 5 weight percent and about 10 weight percent, between about 10 weight percent and about 20 weight percent, between about 20 weight percent and about 30 weight percent, between about 30 weight percent and about 40 weight percent, or between about 40 weight percent and about 50 weight percent of the pellet 100. In other embodiments, the animal product may constitute between about 1 volume percent and about 50 volume percent of the pellet 100, such as between about 1 volume percent and about 5 volume percent, between about 5 volume percent and about 10 volume percent, between about 10 volume percent and about 20 volume percent, between about 20 volume percent and about 30 volume percent, between about 30 volume percent and about 40 volume percent, or between about 40 volume percent and about 50 volume percent of the pellet 100.

Individual fibers 106 of the wool 102 may have a length between about 1.5 cm and about 17 cm. In some embodiments, the length of the fibers 106 may be between about 2.5 cm and about 15 cm. In other embodiments, the length of the fibers 106 may be between about 5.0 cm and about 10 cm. Fibers 106 having the above-listed lengths may provide advantages over shorter fibers, such as fibers obtained from shoddy or scrap wool. For example, individual fibers 106 that are relatively longer may have an increased exposed surface area and may exhibit a larger interface between the wool 102 and a surrounding soil composition, compared to relatively shorter fibers 106 (such as those obtained from shoddy or scrap wool). Enlarging an interface between the individual fibers 106 and the surrounding soil composition may allow the pellets 100 to more easily release nutrients to the surrounding soil composition, as described in further detail below in regard to FIG. 7 and FIG. 8. Enlarging an interface between the wool 102 and the surrounding soil composition may allow the pellets 100 to increase aeration to the surrounding soil composition. Moreover, longer fibers 106 may improve binding of the fibers 106 together during a pelletizing process used to form the pellets 100.

The wool 102 may include natural nitrogen. In some embodiments, the wool 102 may include between about 8% and about 15% nitrogen by weight or volume. In some embodiments, the wool 102 may include between about 10% and about 12% nitrogen by weight or volume. The wool 102 may include natural potassium. In some embodiments, the wool 102 may include between about 1.0% and about 4.0% potassium by weight. In some embodiments, the wool 102 may include between about 2.0% and about 3.0% potassium by weight. For example, the wool 102 may include at least about 2.86% potassium by weight. In some embodiments, the wool 102 may include between about 0.0025% and about 0.0100% magnesium by weight. In some embodiments, the wool 102 may include between about 0.0075% and about 0.0300% calcium by weight. In some embodiments, the wool 102 may include between about 0.0025% and about 0.0035% phosphorus by weight. Furthermore, the wool 102 may include one or more of sodium, sulfur, aluminum, barium, carbon, cobalt, copper, iron, manganese, molybdenum, strontium, titanium, or zinc.

In some embodiments, the pellet 100 may have a generally cylindrical shape. In some embodiments, the pellet 100 may have a diameter between about 2.0 mm and about 15 mm, such as between about 3.0 mm and about 10 mm or between about 5.0 mm and about 8.0 mm. Furthermore, the pellet 100 may have a length between about 3.0 mm and about 25 mm, between about 5.0 mm and about 20 mm, or between about 10 mm and about 15 mm. Although the shape of the pellet 100 is illustrated as being cylindrical in FIG. 1, it is understood that the pellet 100 may have any geometric shape including, for example, a cuboid, ovoid, disc, sphere, etc. Although the wool 102 is described herein as being in the form of a pellet 100, the disclosure is not so limited. The wool 102 may be in the form of a plug, capsule, stake, bar, ring, etc. For example, the pellet 100 may be in the form of a stake configured to be driven into soil proximate one or more plants. The stake may have an outer diameter between about 1.5 cm and about 6 cm and a length between about 2.5 cm and about 30 cm. The stake may have a generally pointed end to facilitate driving the stake into the ground (e.g., into soil).

In some embodiments, the pellet 100 may include other natural nutrient supplements added to the wool 102, the binding agent 104, or both. In some such embodiments, the pellets 100 may be configured to provide the other natural nutrients to the fertilizer composition or to plants or a soil composition proximate the fertilizer composition. For example, the pellet 100 may include nutrient supplements comprising one or more of nitrogen, potassium, calcium, phosphorus, sodium, magnesium, sulfur, aluminum, barium, carbon, cobalt, copper, iron, manganese, molybdenum, strontium, titanium, or zinc. As described below with reference to FIG. 7, adding natural nutrient supplements to the pellets 100 may facilitate providing nutrients in a more uniform manner over a given length of time, compared to pellets 100 lacking added natural nutrient supplements. For example, a nutrient supplement included in the pellet 100 may be provided to the fertilizer composition initially while the wool 102 of the pellets 100 is decomposing. After the nutrient supplement is at least partially depleted, the wool 102 may be sufficiently decomposed to continue providing the given nutrient to the fertilizer composition. In other embodiments, the nutrient supplement may be selected to provide one or more nutrients in which the wool 102 is deficient to a fertilizer composition or a soil composition proximate the fertilizer composition.

It is contemplated that, in some embodiments, the pellet 100 may further include bone meal. As used herein, the term "bone meal" means and includes a composition made from steamed and crushed animal bones that is rich in phosphorus and also includes calcium and some nitrogen.

The pellet 100 may have a shelf life of at least two years in cool, dry conditions. In other words, the pellet 100 may be capable of storage for at least two years without significantly compromising qualities (e.g., nutrient concentrations, properties, form, etc.) thereof.

In some embodiments, the pellets 100 may lack any component that would compromise an ability to use the pellets 100 to grow plants organically according to the USDA organic regulations, as discussed above. In other words, every component of the pellets 100 may qualify for use to grow plants organically per the USDA organic regulations.

Figure 2:
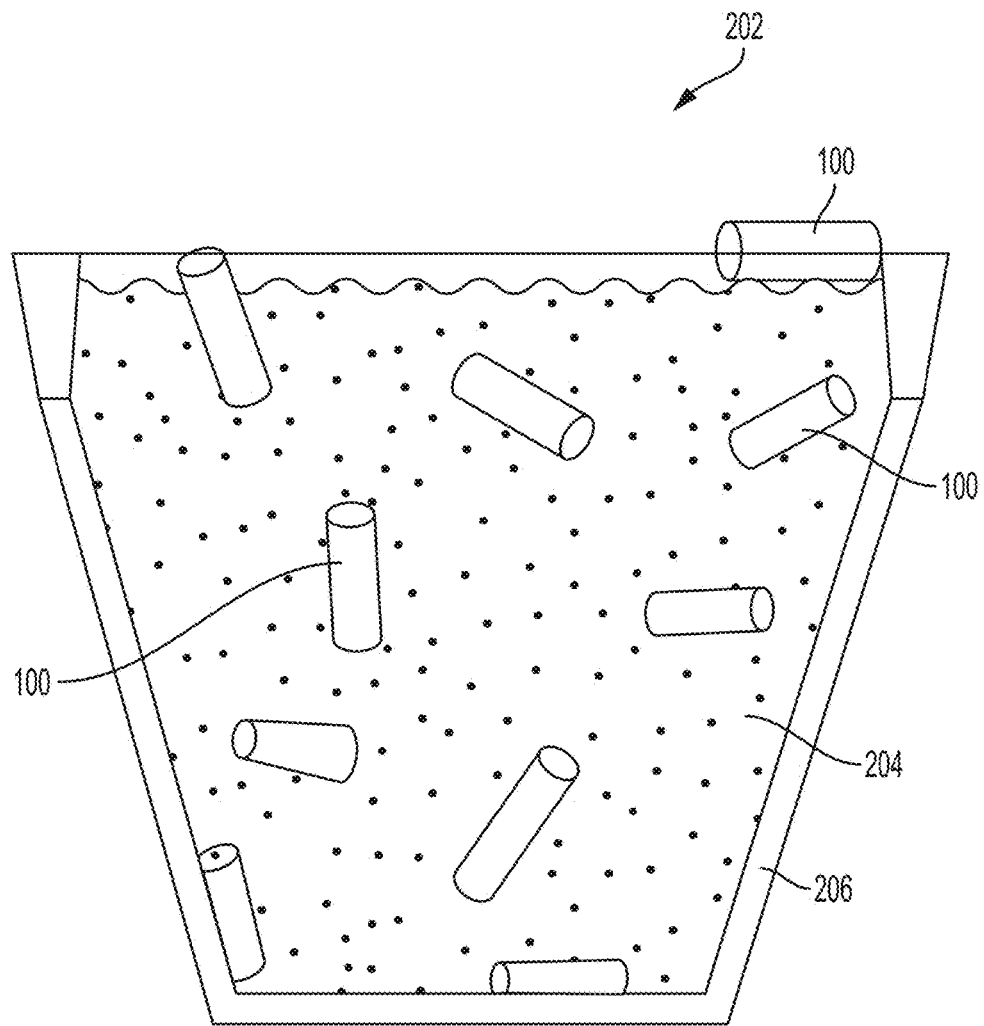
FIG. 2 is a simplified cross-sectional view of a fertilizer composition including the pellets of FIG. 1.

FIG. 2 is a simplified cross-sectional view of a fertilizer composition 202 including the pellets 100, according to an embodiment of the present disclosure. The fertilizer composition 202 may include a growing media 204 and a plurality of pellets 100 distributed throughout the growing media 204. The plurality of pellets 100 may be distributed at least substantially uniformly throughout the growing media 204. As used herein, the term "uniform" and any derivative terms mean at least substantially evenly. In other words, concentrations of pellets 100 may not differ substantially from one portion of the fertilizer composition 202 to another portion thereof. For example, when the fertilizer composition 202 is disposed within a planting pot 206, as shown in FIG. 2, the plurality of pellets 100 may be distributed from a top of the fertilizer composition 202 to a bottom of the fertilizer composition 202 within the planting pot 206. Furthermore, the plurality of pellets 100 may be distributed from a first side of the fertilizer composition 202 to a second, opposite side of the fertilizer composition 202 within the planting pot 206.

In some embodiments, the fertilizer composition 202 may include between about 1 volume percent and about 30 volume percent of the pellets 100, between about 30 volume percent and about 50 volume percent of the pellets 100, between about 50 volume percent and about 75 volume percent of the pellets 100, or between about 75 volume percent and about 90 volume percent of the pellets 100. In other embodiments, the fertilizer composition 202 may include between about 1 weight percent and about 90 weight percent of the pellets 100, such as between about 1 volume percent and about 30 volume percent, between about 30 volume percent and about 50 volume percent, between about 50 volume percent and about 75 volume percent, or between about 75 volume percent and about 90 volume percent. In some embodiments, the pellets 100 include wool 102 and at least one animal product, as described above. In other embodiments, the pellets 100 include wool 102, but do not include an animal product.

The growing media 204 may include one or more of soil, dirt, clay, sand, peat, perlite, coir, wood, wheat straw, composted bark, biodigester remains, uncomposted bark, wood, wood fiber, animal manure (e.g., bovine manure, poultry manure, etc.). The plurality of pellets 100 may be distributed throughout the growing media 204 by any number of conventional greenhouse or commercial soil mixing systems. For example, the plurality of pellets 100 may be distributed throughout the growing media 204 through barrel or drum mixing systems, inline continuous mixing systems, or mechanized or non-mechanized bulk mixing, etc.

In some embodiments, such as where the pellets 100 do not include one of blood meal, meat and bone meal, fish meal, or tankage, or less than a desired amount of the blood meal, meat and bone meal, fish meal, or tankage, the growing media 204 may further include one or more of an animal product selected from the group consisting of blood meal, meat and bone meal, fish meal, or tankage. The animal product may constitute between about 1 weight percent and about 50 weight percent of the fertilizer composition 202, such as between about 1 weight percent and about 10 weight percent, between about 10 weight percent and about 20 weight percent, between about 20 weight percent and about 30 weight percent, between about 30 weight percent and about 40 weight percent, or between about 40 weight percent and about 50 weight percent of the fertilizer composition 202. In other embodiments, the animal product may constitute between about 1 volume percent and about 50 volume percent of the fertilizer composition 202, such as between about 1 volume percent and about 10 volume percent, between about 10 volume percent and about 20 volume percent, between about 20 volume percent and about 30 volume percent, between about 30 volume percent and about 40 volume percent, or between about 40 volume percent and about 50 volume percent of the fertilizer composition 202.

In some embodiments, the animal product may be provided to the fertilizer composition 202 at a concentration between about 1 kg of the animal product per cubic meter ($m^3$) of the fertilizer composition 202 and about 10 kg animal product per cubic meter of the fertilizer composition 202, such as between about 1 kg and about 2 kg, between about 2 kg and about 3 kg, between about 3 kg and about 5 kg, between about 5 kg and about 7 kg, or between about 7 kg and about 10 kg animal product per cubic meter of the fertilizer composition 202. In some embodiments, the animal product is provided to the fertilizer composition 202 at a concentration of about 2.954 kg of the animal product per cubic meter of the fertilizer composition 202.

When using the fertilizer composition 202 for planting in the ground instead of in a planting pot 206, the pellets 100 of the fertilizer composition 202 may be distributed throughout at least a portion of a soil composition around an anticipated root structure of the plant. For example, the fertilizer composition 202 may be distributed from a top surface of the ground to at least about 12 cm below the top surface of the ground, such as by tilling the fertilizer composition 202 into the ground. In some embodiments, the fertilizer composition 202 may be distributed from a top surface of the ground to at least about 24 cm below the top surface of the ground. In some embodiments, the fertilizer composition 202 may be distributed from a top surface of the ground to at least about 48 cm below the top surface of the ground. In some embodiments, the fertilizer composition 202 may be distributed from a top surface of the ground to at least about 75 cm below the top surface of the ground.

The fertilizer composition 202 may be used in root zones of plants. The pellets 100 may improve soil porosity of a soil composition (i.e., air or void space between soil particles) in comparison to conventional fertilizers. Improving soil porosity may, in turn, improve water distribution and nutrient retention properties of the fertilizer composition 202 beneath a top surface of the soil composition. In other words, improving soil porosity may improve water distribution and nutrient retention properties of the fertilizer composition 202 in the root zones of the plants. Moreover, the pellets 100 may protect the fertilizer composition 202 and any plants growing in the soil including the fertilizer composition 202, from toxins and other injurious substances. For example, physical characteristics of the wool 102 (e.g., elasticity) may protect the soil composition from ferrous oxide, $H_2S$ gas, and $CO_2$. Additionally, physical characteristics of the wool 102 may promote biological and microbial activities such as, for example, nitrification (i.e., biological oxidation of ammonia or ammonium to nitrite and the oxidation of nitrite to nitrate) and sulfur oxidation.

Some embodiments of the present disclosure include bagged mixes of the fertilizer composition 202. For example, some embodiments of the present disclosure include a bagged mix of the fertilizer composition 202, the fertilizer composition 202 including a growing media 204 and a plurality of pellets 100 distributed at least substantially uniformly throughout the growing media 204. The growing media 204 may comprise at least one animal product, as described above.

In some embodiments, the fertilizer composition 202 may lack any components that would compromise an ability to use the fertilizer composition 202 to grow plants organically according to the USDA organic regulations, as discussed above. In other words, everything included in the fertilizer composition 202 may qualify for use to grow plants organically per the USDA organic regulations.

Figure 3:
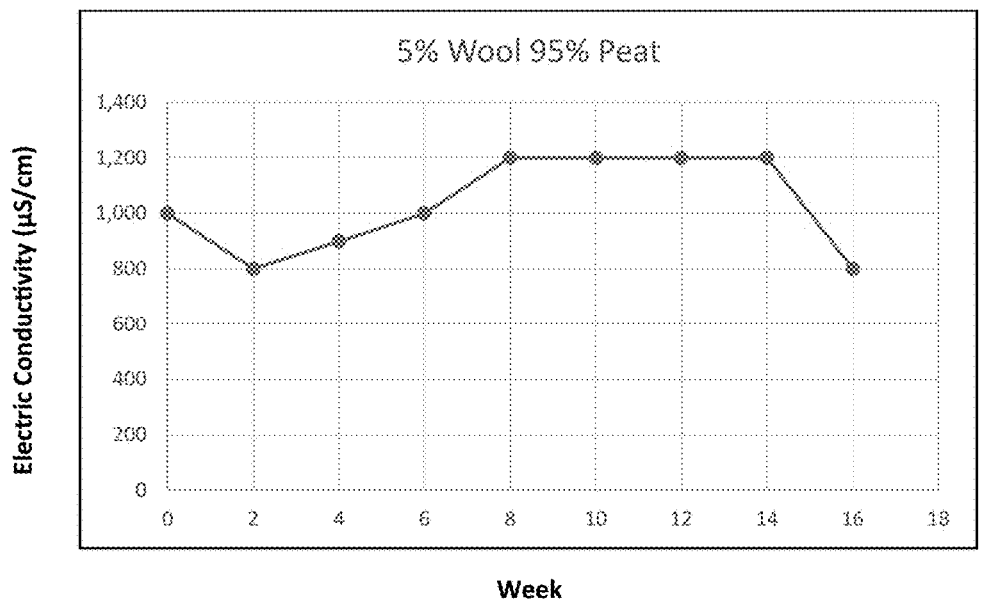
FIG. 3 is a graph illustrating a conductivity of leachate from a composition comprising wool pellets and peat.

Each of the wool pellets 100 and the at least one animal product may provide one or more nutrients to the fertilizer composition 202. FIG. 3 is a graph illustrating a conductivity of leachate from a composition comprising wool pellets and peat (also referred to in the art as "a nutrient delivery curve"). As shown in FIG. 3, the wool pellets may begin delivering nutrients, as indicated by the electric conductivity of the fertilizer composition 202, substantially immediately after disposing the fertilizer composition 202 into the soil composition and exposing the fertilizer composition 202 to moisture. In some embodiments, the fertilizer composition 202 provides nutrients responsive to exposure to moisture (e.g., water). By way of nonlimiting example, within the first week, the wool pellets 100 may provide a substantial amount of nutrients to the soil composition. The wool pellets 100 may provide the nutrients to the soil composition at a substantially uniform rate for at least about 16 weeks, as illustrated in FIG. 3. Without wishing to be bound by any theory, it is believed that urine and fecal matter of tag wool in the pellets 100 may provide an initial amount of nutrients to the soil composition while the remaining portions of the wool 102 are decomposing. After the urine and fecal matter have been dissolved and provided to the soil composition, the wool pellets 100 may be substantially decomposed to provide nutrients to the soil composition.

Figure 4:
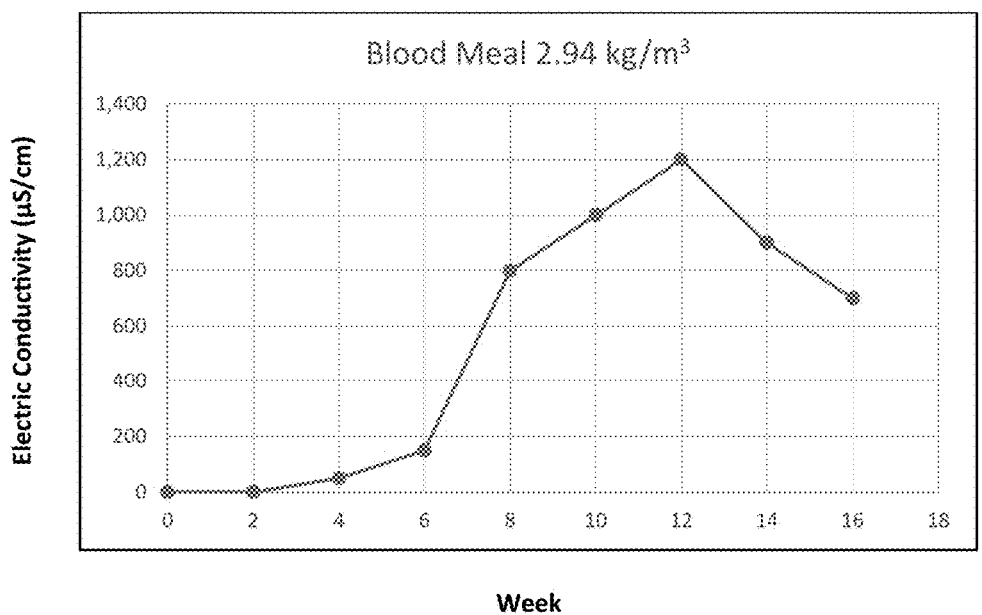
FIG. 4 is a graph illustrating a conductivity of leachate from a composition comprising blood meal in a base soil composition.

FIG. 4 is a graph illustrating a conductivity of leachate from a composition comprising about 2.94 kg blood meal per cubic meter of base soil composition (e.g., peat). As shown in FIG. 4, the blood meal may provide nutrients to the soil composition after a predetermined period of time. For example, after between about 4 weeks and about 6 weeks, the blood meal may begin to solubilize, dissolve into the soil composition, and provide nutrients thereto. In some embodiments, an amount of nutrients provided by the blood meal may reach a maximum between about 10 weeks and about 12 weeks, such as at about 10 weeks, although the disclosure is not so limited.

As illustrated in FIG. 3 and FIG. 4, the at least one animal product (e.g., blood meal) may provide nutrients to the soil composition at a different rate than the wool pellets 100. Advantageously, the blood meal and the wool pellets 100 may provide nutrients to the soil composition at a time when a plant proximate the fertilizer composition 202 comprising the wool pellets 100 and the blood meal requires an increasing amount of nutrient, such as when a mass of the plant is larger and requires an increasing amount of nitrogen or other nutrients for continued growth, fruit and vegetable production, and maintenance.

Figure 5:
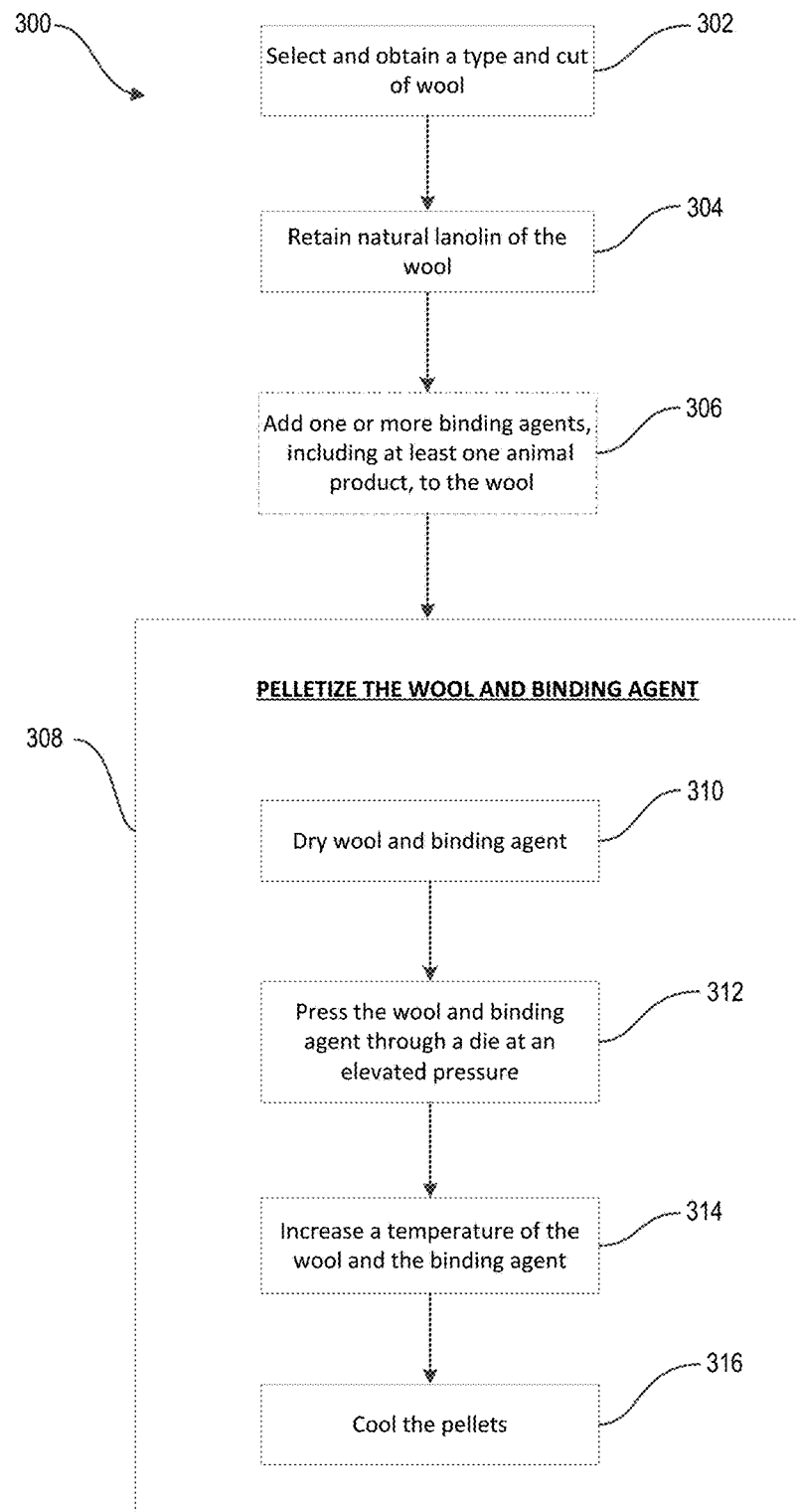
FIG. 5 is a flowchart of a method of making fertilizing and watering pellets, according to an embodiment of the present disclosure.

FIG. 5 is a flowchart of a method 300 of making wool pellets according to an embodiment of the present disclosure. Referring to FIG. 1 and FIG. 2, the method 300 may include selecting a type and cut of wool 102 to be used in the pellets 100, as represented in act 302. Selecting a type and cut of wool 102 to be used in the pellets 100 may include selecting sheep wool. In some embodiments, the sheep wool may comprise wool from the belly area of the sheep, may comprise tag wool, or a combination thereof. In other embodiments, the wool may come from any area of an animal's body. In some embodiments, the wool 102 may include wool 102 from one or more of a sheep, goat, llama, alpaca, camel, or other wool-bearing mammal. In some embodiments, the wool 102 may include virgin wool and may not include shoddy or recycled wool 102. Because the wool 102 may include virgin wool from sheep rather than shoddy wool or recycled wool, the wool 102 may be more readily available to make the pellets 100 and may retain its untreated, natural qualities.

In some embodiments, the natural lanolin of the wool 102 may be retained (e.g., may not be removed), as represented in act 304. In other words, the wool 102 may not be processed to remove lanolin therefrom. Furthermore, the wool 102 may not be treated with solvents, stripping agents, or detergents that might remove the lanolin from the wool 102. In some embodiments, the wool 102, once removed from the sheep, may not be modified, conditioned, or chemically treated prior to forming pellets 100 therefrom. As a result, water repelling features of the wool 102 may be retained. Furthermore, the wool 102 may not be treated in any way that may compromise an ability to use the wool 102 to grow plants organically according to the USDA organic regulations, as discussed above. In other words, in some embodiments, any and all treatments performed on the wool 102 may not disqualify the pellets 100 including the wool 102 from use in growing plants organically per the USDA organic regulations.

In some embodiments, one or more binding agents 104, including at least one animal product, may be added to the wool 102, as represented in act 306. In some embodiments, adding the one or more binding agents 104 to the wool 102 may include adding one or more of sawdust, grain, coir, at least one animal product (e.g., blood meal, meat and bone meal, fish meal, or tankage), and animal manure, or any other known natural binding agents to the wool 102. The binding agent 104 may be added at an amount such that the binding agent 104 constitutes between about 1 weight percent and about 50 weight percent of the pellet 100 or between about 1 volume percent and about 50 volume percent of the pellet 100, as described above with reference to FIG. 1. In some such embodiments, the pellet 100 may comprise between about 1 percent and about 50 percent by weight or by volume of the at least one animal product.

In other embodiments, no binding agent 104 may be added to the wool 102. To facilitate description of the method 300 of making the pellets 100, the following process is described using both wool 102 and a binding agent 104. However, it is understood that including a binding agent 104 is optional, and that the process may be completed without including a binding agent 104. Accordingly, in some embodiments, the method 300 may include forming the pellets 100 without the at least one animal product or without another type of binding agent 104. In some such embodiments, the at least one animal product may be added to the fertilizer composition 202 separate from the pellets 100.

In some embodiments, when a binding agent 104 is added to the wool 102, the binding agent 104 may be selected for inclusion in the pellets 100 to avoid compromising an ability to use the pellets 100 to grow plants organically according to the USDA organic regulations, as discussed above. In other words, any binding agent 104 included in the pellets 100 may comprise a material that may qualify as an organic material under USDA organic regulations.

The method 300 may also include pelletizing the wool 102 and the optional binding agent 104, as represented in act 308. Pelletizing the wool 102 and the binding agent 104 may include drying the wool 102 and the binding agent 104, as represented in act 310. In some embodiments, the wool 102, the binding agent 104, or both may exhibit a substantially uniform moisture content therethrough which may facilitate binding and extrusion of the material. Drying the wool 102 and the binding agents 104 may promote a consistent moisture level throughout the wool 102 and the binding agents 104. In other embodiments, the wool 102 and the binding agent 104 may be dried to have at least substantially no moisture. In some embodiments, the wool 102 and the binding agents 104 may be dried with dryer drums.

In some embodiments, the pellets 100 may be formed using a flat die pellet mill. For example, pelletizing the wool 102 may include pressing the wool 102 and binding agent 104 through one or more dies at an elevated pressure, as represented in act 312. Furthermore, the wool 102 and binding agent 104 may be pelletized through extrusion using an extruder. Pressing the wool 102 and binding agent 104 through one or more dies may increase a temperature of the wool 102 and the binding agent 104, as represented in act 314 which may cause one or both of the wool 102 or the binding agent 104 to release lanolin or other substances that may bind the fibers 106 to the binding agent 104. For example, in embodiments where sawdust is used as a binding agent 104, increasing a temperature of the sawdust may release natural lignins therein, which may bind the wool 102 and the sawdust together. In some embodiments, lanolin in the wool 102 may comprise a lubricant during the extrusion process.

In some embodiments, the wool 102 and binding agent 104 may be exposed to temperatures between about 90° C. and about 250° C. during the extrusion process, such as between about 90° C. and about 150° C., or between about 90° C. and about 125° C. Exposing the wool 102 and the binding agent 104 to such temperatures may help to control a bacteria level in such materials. For example, the temperature of the wool 102 and the binding agent 104 may be allowed to rise to a level sufficient to kill at least substantially all the bacteria therein without using a bactericide, such as a bactericide that would otherwise disqualify the pellets 100 from use to grow plants according to USDA organic regulations.

The pellets 100 may exit the extruder at temperatures between about 90° C. and about 250° C. Furthermore, the pellets 100 may be soft when they exit the extruder. The hot and soft pellets 100 may be cooled, such as in a cooling tower, as represented act 316. As the pellets 100 cool, the pellets 100 may harden. After cooling, the pellets 100 may be stored for up to two years without compromising qualities of the pellets 100 while the pellets 100 await bagging, bulk distribution, or use. In some embodiments, during the pelletizing process, no acts may be taken that may compromise an ability to use the pellets 100 to grow plants organically according to the USDA organic regulations, as discussed above.

Figure 6:
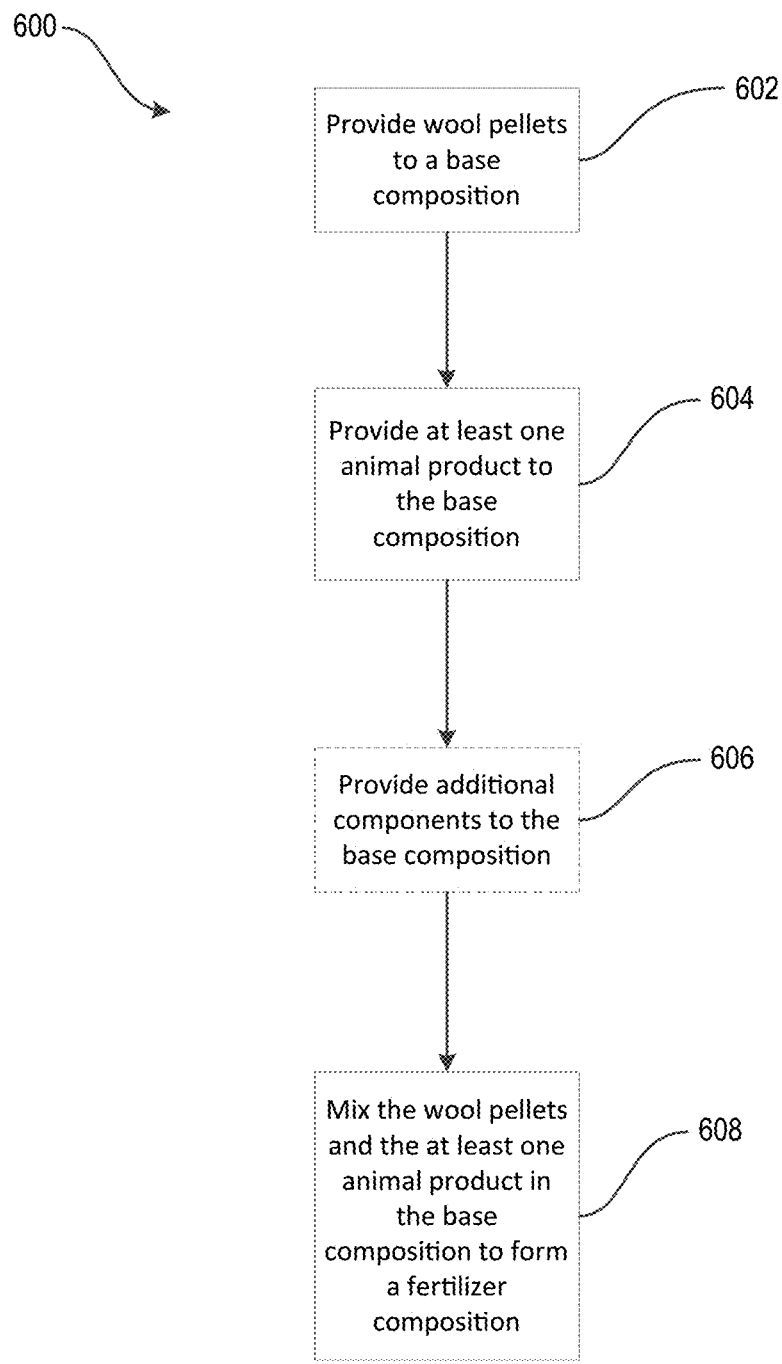
FIG. 6 is a flowchart of a method of forming a fertilizer composition, according to an embodiment of the disclosure.

FIG. 6 illustrates a method 600 of forming a fertilizer composition (e.g., the fertilizer composition 202 (FIG. 2)) according to embodiments of the disclosure. The method 600 may include act 602 including providing wool pellets to a base composition comprising one or more of soil, dirt, clay, sand, peat, perlite, coir, wood, wood chips, wood fiber, wheat straw, composted bark, uncomposted bark, biodigester remains, or animal manure; act 604 including providing at least one animal product to the base composition; act 606 including optionally adding additional components to the base composition; and act 608 including mixing the wool pellets, the at least one animal product, and the optional additional components in the base composition to form a fertilizer composition.

Act 602 includes providing wool pellets to a base composition. The base composition may include one or more of soil, dirt, clay, sand, peat, perlite, coir, wood, wood chips, wood fiber, wheat straw, composted bark, uncomposted bark, biodigester remains, or animal manure, or another composition that will form a portion of the fertilizer composition 202 (FIG. 2).

Act 604 may include providing at least one animal product to the base composition. The at least one animal product may include at least one material selected from the group consisting of blood meal, meat and bone meal, fish meal, and tankage. In some embodiments, the at least one animal product is provided to the base composition such that the at least one animal product constitutes between about 1 volume percent and about 50 volume percent, or between about 1 weight percent and about 50 weight percent of the fertilizer composition, as described above with reference to FIG. 2.

The at least one animal product may be added to the base composition in the pellets 100. In other words, the pellets 100 may include the at least one animal product therein. In other embodiments, the at least one animal product may be provided to the base composition separate from the pellets 100. In some such embodiments, the at least one animal product may be separate from the pellets 100. Stated another way, the pellets 100 may not comprise the at least one animal product. In some such embodiments, the at least one animal product may be provided to the base composition as a powder. In yet other embodiments, at least a portion of the at least one animal product of the fertilizer composition may be provided with the pellets 100 and at least another portion of the at least one animal product may be provided separately from the pellets 100.

Act 606 may include providing additional components to the base composition. By way of nonlimiting example, one or more natural supplements (e.g., nitrogen, potassium, calcium, phosphorus, sodium, magnesium, sulfur, aluminum, barium, carbon, cobalt, copper, iron, manganese, molybdenum, strontium, titanium, or zinc) may be added to the base composition. In some embodiments, the additional component comprises copper (e.g., copper sulfate, or any other organic source of copper). The copper sulfate may be provided at a composition of between about 0.1 $g/m^3$ of the fertilizer composition and about 100 $g/m^3$ of the fertilizer composition, such as between about 0.1 $g/m^3$ and about 1 $g/m^3$, between about 1 $g/m^3$ and about 10 $g/m^3$, between about 10 $g/m^3$ and about 50 $g/m^3$, or between about 50 $g/m^3$ and about 100 $g/m^3$ of the fertilizer composition.

Act 608 may include mixing the pellets 100, the at least one animal product, and the optional additional components in the base composition to form the fertilizer composition 202. The fertilizer composition may comprise at least the wool pellets 100 and the at least one animal product dispersed substantially uniformly throughout the fertilizer composition 202.

Figure 7:
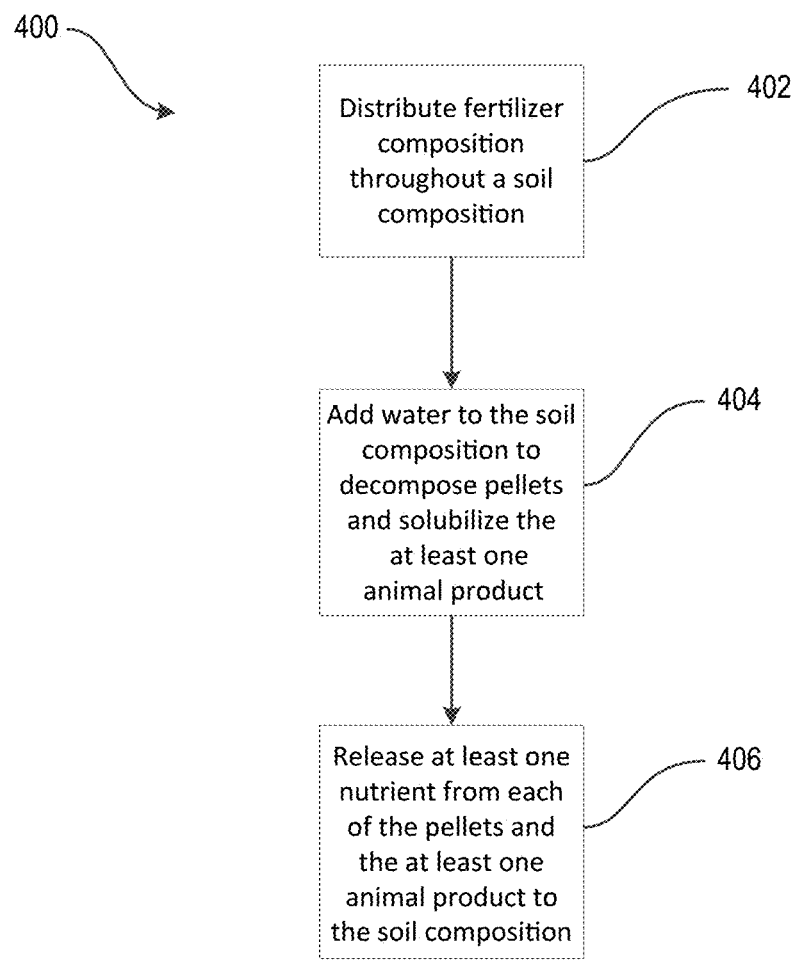
FIG. 7 is a flowchart of a method of providing nutrients to plants with the fertilizer composition, according to an embodiment of the present disclosure.

Some embodiments described herein include methods of providing substances to a plant (e.g., to roots of a plant). FIG. 7 is a flowchart of a method 400 of providing nutrients to a plant with the fertilizer composition 202. Referring to FIG. 1, FIG. 2, and FIG. 7 together, the method 400 may include distributing the fertilizer composition 202 throughout a soil composition in which a plant is to be planted or is already planted, as represented in act 402. For example, the fertilizer composition 202 may be distributed throughout a soil composition in a planting pot 206 (FIG. 2) or in the ground. The pellets 100 and the at least one animal product may be distributed throughout the fertilizer composition 202 to have a substantially uniform concentration and distribution within the fertilizer composition 202, as described above in regard to FIG. 2. Similarly, the fertilizer composition 202 may be distributed throughout the soil composition to have a substantially uniform concentration and distribution therein.

The method 400 may include adding water to the soil composition to decompose the pellets 100 and to solubilize the at least one animal product, as represented in act 404. As used herein, the term "decompose" may mean to decay or to break down into simpler constituents (e.g., elements, materials, etc.).

As shown in act 406, the pellets 100 and the at least one animal product may release at least one nutrient into the surrounding soil composition responsive to exposure to water. In some embodiments, each of the pellets 100 and the at least one animal product may release nitrogen into the surrounding soil composition, and as a result, may provide nitrogen to a plant (e.g., roots of a plant) growing in the soil composition. The nitrogen may originate from one or both of the pellets 100 or the at least one animal product. In some embodiments, the pellets 100 may provide nitrogen to the soil composition initially and the at least one animal product may provide an increasing amount of nitrogen after a period of time, as described above with reference to the nutrient delivery curves in FIG. 3 and FIG. 4. In some embodiments, the pellets 100 and the at least one animal product provide different amounts of nitrogen at different times. Stated another way, the combination of the pellets 100 and the at least one animal product may provide the advantageous effect of providing nutrients to a plant over an extended period of time (e.g., up to at least about 4 months, at least about 6 months, at least about 8 months, or at least about 12 months). By way of nonlimiting example, the pellets 100 may provide an initial amount of nutrients as the pellets 100 decompose responsive to exposure to water. As the at least one animal product solubilizes into the fertilizer composition 202 and the surrounding soil composition responsive to exposure to the water, the at least one animal product may provide an increasing amount of nutrients to the fertilizer composition 202 and the soil composition. In other words, as the plant proximate the fertilizer composition 202 grows, the at least one animal product may provide a boost of nutrients (e.g., nitrogen) to the roots of the plant to further increase growth, flowering, and overall health of the plant.

Providing nitrogen to plants helps plant foliage to develop faster and stronger. In some embodiments, the pellets 100 and the at least one animal product may release potassium into the surrounding soil composition 202, and as a result, may provide potassium to a plant growing in the soil composition 202. Providing potassium to plants helps in root development, water absorption of the plants, reduces disease in plants, and helps to prevent heat damage to plants. In some embodiments, the pellets 100 may release one or more of calcium, phosphorus, sodium, magnesium, sulfur, aluminum, barium, carbon, cobalt, copper, iron, manganese, molybdenum, strontium, titanium, and zinc into the surrounding soil composition. In some embodiments, the at least one animal product may release phosphorus into the soil composition which may stimulate root development, increase stack and stem strength of the plant, facilitate uniform and early crop maturity, and improve a quality of the crop. In some embodiments, the at least one animal product may provide more phosphorus to the soil composition than the wool.

Because the nutrients are released while the pellets 100 decompose, the pellets 100 may provide a slow but continuous release of the nutrients over a given timeline. For example, depending on frequencies of providing water to the pellets 100 and temperatures of the soil composition, the pellets 100 may provide nutrients to the plants for periods between four weeks and twelve months. In some embodiments, the pellets 100 may provide nutrients substantially immediately upon being disposed in the soil composition 202 and responsive to exposure to water. Of course, it is contemplated that in other embodiments, the pellets 100 may be formulated such that at least the wool 102 thereof may take at least about two weeks, at least about four weeks, or at least about six weeks to decompose sufficiently to begin to provide significant nutrients to plants.

In some embodiments, as described above, the pellets 100 may include at least one nutrient supplement added thereto, wherein the nutrient supplement provides a given nutrient while the pellet 100 is beginning to decompose (e.g., a quick-acting natural fertilizer). As a nonlimiting example, the pellets 100 may have a nutrient supplement added thereto, and the nutrient supplement may provide one or more nutrients (e.g., nitrogen) to a plant for a first two weeks of use while the pellets 100 begin to decompose. As another nonlimiting example, the wool 102 may include urine and fecal matter (e.g., manure) from the animal from which the wool 102 was obtained. The urine and fecal matter may provide an initial amount of nutrients to the soil while the wool 102 is decomposing. After an initial period of time (e.g., about two weeks), the nutrient supplement may become depleted and the wool 102, now partially decomposed, may begin to provide nitrogen and other nutrients to the plant. In some embodiments, the nutrient supplements added to the pellets 100 may be tailored (e.g., an amount added to the pellets 100 may be tailored) such that the nutrient supplements will deplete at least about a same time as the pellets 100 begin to provide the nutrients. In some embodiments, nutrient supplements containing one or more of nitrogen, potassium, calcium, phosphorus, sodium, magnesium, sulfur, aluminum, barium, carbon, cobalt, copper, iron, manganese, molybdenum, strontium, titanium, and zinc may be added to the pellets 100. In other embodiments, the pellets 100 may not include a nutrient supplement. In such embodiments, the pellets 100 may be allowed to decompose for a time sufficient to begin releasing nutrients before a plant is disposed within the soil composition.

Because the pellets 100 and the at least one animal product are distributed at least substantially uniformly throughout the fertilizer composition 202, the pellets 100 and the at least one animal product may provide an at least substantially uniform distribution of the nutrients throughout the fertilizer composition 202. Accordingly, the combination of the pellets 100 and the at least one animal product may provide advantages over conventional fertilizers by uniformly providing nutrients to roots of plants (e.g., to at least substantially all locations of the roots of the plants within the soil composition including the fertilizer composition 202). Furthermore, because the nutrients are released as the pellets 100 decompose, once the pellets 100 sufficiently decompose, the pellets 100 may deliver the nutrients in an at least substantially uniform manner over a period of time. In other words, over a given amount of time, the pellets 100 may deliver the nutrients at an at least substantially constant rate over that time period. For example, over a week's time, the pellets 100 may deliver at least substantially a same amount of nutrients each day of the week. The at least one animal product may be formulated and configured to provide nutrients to the soil composition after a predetermined period of time. In some embodiments, the at least one animal product provides nutrients to the soil composition after the plant has reached a predetermined mass and requires additional nutrients compared to a smaller plant (e.g., a plant between 0 weeks and about 6 weeks from germination). In some embodiments, providing the pellets 100 and the at least one animal product in the fertilizer composition 202 provides benefits of maintaining a desired amount of nutrients in the surrounding soil composition. For example, in some embodiments, using at least one animal product may reduce an amount of pellets 100 that may be desired, which may prevent too high a concentration of one or more nutrients or salts that are provided by the wool 102. Accordingly, the combination of the pellets 100 and the at least one animal product may provide a desired concentration of each nutrient to the soil composition.

Because the pellets 100 and the at least one animal product are distributed at least substantially uniformly throughout the fertilizer composition 202, the pellets 100 may promote an at least substantially uniform aeration throughout the fertilizer composition 202 and an associated soil composition. Accordingly, the fertilizer composition 202 may provide advantages over other known fertilizing methods by at least substantially uniformly providing aeration to roots of plants.

Furthermore, the fertilizer composition 202 may be mildew resistant due to mildew resistant properties of the wool 102. As a result, the fertilizer compositions 202 including the pellets 100 may help to keep plants healthy even when the plants are overwatered. Furthermore, the pellets 100 may act as a natural pesticide for pests such as slugs and snails while the at least one animal product may act as a natural deterrent for animals such as rabbits, deer, squirrels, or other herbivorous animals. Accordingly, the fertilizer compositions 202 may be resistant to infestations of slugs and snails and may be a natural repellant to some animals.

In tests performed by the inventors, using the pellets 100 to provide nutrients to plants showed significant increases in a size of the plants and a number of blooms of the plant when compared to traditional greenhouse soil mixes having common fertilizers. The tests were performed over a twelve-week period. A first test group included plants planted in a fertilizer composition 202 having by volume 90% peat and 10% wool pellets 100. A second test group included plants planted in a fertilizer composition 202 having by volume 95% peat and 5% wool pellets 100. A third test group included plants planted in a soil composition having by volume 70% peat and 30% perlite (and no pellets 100), which is considered a traditional greenhouse soil mix. A fourth test group included plants planted in a soil composition having by volume 70% peat and 30% wood chips (and no pellets 100). For the first six weeks, all test groups were watered with greenhouse water including a balance nutrient fertilizer having 120 ppm nitrogen. For the second 6 weeks, each group was watered with clear water and no additional fertilizers were added to the soil compositions. The average greenhouse temperature for the trial was about 20° C.

After the twelve-week period, in comparison to the plants of the fourth test group, the plants in the first test group (10% wool pellets) were 2.0 to 3.0 times bigger in size and had 3.0 to 4.0 times more blooms. In comparison to the plants of the third test group, the plants in the first test group (10% wool pellets) were 1.5 to 2.0 times bigger in size and had 1.5 to 2.0 times more blooms. Furthermore, in comparison to the plants of the fourth test group, the plants in the second test group (5% wool pellets) were 1.5 to 2.0 times bigger in size and had 2.0 to 3.0 times more blooms. In comparison to the plants of the third test group, the plants in the second test group (5% wool pellets) were 1.25 to 1.75 times bigger in size and had 1.5 to 2.0 times more blooms. Accordingly, as demonstrated by the results of the above tests, using wool pellets 100 in soil compositions to grow plants provides better results (e.g., size and health of plants) when compared to traditional greenhouse fertilizers while, at the same time, growing the plants organically.

In some embodiments, when using the pellets 100 to provide nutrients to plants, no steps may be taken that may compromise an ability to use the pellets 100 to grow plants organically according to the USDA organic regulations, as discussed above. In other words, every step taken while using the pellets 100 to provide nutrients to plants may qualify as growing plants organically per the USDA organic regulations.

In another test, nutrient delivery of fertilizer compositions including blood meal in addition to the pellets 100 was compared to nutrient delivery of conventional fertilizer compositions. In particular, leaf tissue of plants planted in different fertilizer compositions was measured. Table I illustrates the results of the leaf tissue analysis tests.

TABLE I

| Fertilizer Composition | Nitrate | Total N (%) | P | K | Ca | Mg | S | Mn | Na | Zn | Cu | Mo |
| --- | --- | --- | --- | --- | --- | --- | --- | --- | --- | --- | --- | --- |
| Control | 6100 | 7.41 | 0.72 | 3.2 | 0.80 | 0.45 | 0.47 | 77 | 260 | 51 | 11.8 | 0.96 |
| 2 wt. % wool pellets with blood meal | 1150 | 6.42 | 0.27 | 3.3 | 1.04 | 0.62 | 0.46 | 97 | 285 | 83 | 3.9 | 0.74 |
| 2 wt. % wool pellets without blood meal | Less than 0.1 | 2.81 | 0.20 | 3.3 | 1.15 | 0.61 | 0.44 | 117 | 272 | 62 | 2.9 | 0.33 |

TABLE I-continued

| Fertilizer Composition | Nitrate | Total N (%) | P | K | Ca | Mg | S | Mn | Na | Zn | Cu | Mo |
|---|---|---|---|---|---|---|---|---|---|---|---|---|
| 5 wt. % wool pellets with blood meal | 7380 | 6.19 | 0.34 | 4.3 | 1.10 | 0.57 | 0.59 | 83 | 497 | 82 | 2.2 | 0.26 |
| 5 wt. % wool pellets without blood meal | 1557 | 4.12 | 0.23 | 4.4 | 1.18 | 0.65 | 0.52 | 74 | 332 | 67 | 3.4 | 0.48 |
| 10 wt. % pellets wool with blood meal | 6760 | 6.82 | 0.69 | 5.1 | 0.97 | 0.60 | 0.55 | 72 | 830 | 47 | 1.3 | 0.31 |
| 10 wt. % wool pellets without blood meal | 4900 | 5.30 | 0.40 | 5.5 | 0.99 | 0.63 | 0.52 | 53 | 646 | 55 | 4.1 | 0.68 |

Unless specified otherwise, all units in Table I are in mg of the specified nutrient per kg of the soil composition. The control composition comprised about 90 weight percent peat and about 10 weight percent perlite treated with the manufacturer recommended quantity of fertilizer (e.g., NUTRICOTE® fertilizer). As can be seen from Table I, the fertilizer compositions including both pellets and blood meal exhibited an increased amount of nitrates, potassium, calcium, magnesium, sulfur, manganese, sodium, and zinc compared to the control group and the fertilizer compositions with only the pellets. In some embodiments, a desired amount of one or more nutrients (e.g., nitrogen, copper, molybdenum, etc.) may be added to the fertilizer composition 202 (e.g., to the base composition, to the pellets 100, or both) to increase a concentration of such nutrients in the fertilizer composition 202 or the soil composition in which the fertilizer composition 202 is mixed. In some embodiments, the additional nutrients may be provided in the pellets 100 and may be formulated and configured to be delivered therefrom at a desired time. In other embodiments, the additional nutrients may be provided in the fertilizer composition 202 separate from the pellets 100, as described above with reference to FIG. 6. It is contemplated that in some such embodiments, the fertilizer composition 202 may exhibit a nutrient delivery curve for each of the nutrients in Table I greater than the nutrient delivery curve of the control fertilizer composition.

Figure 8:
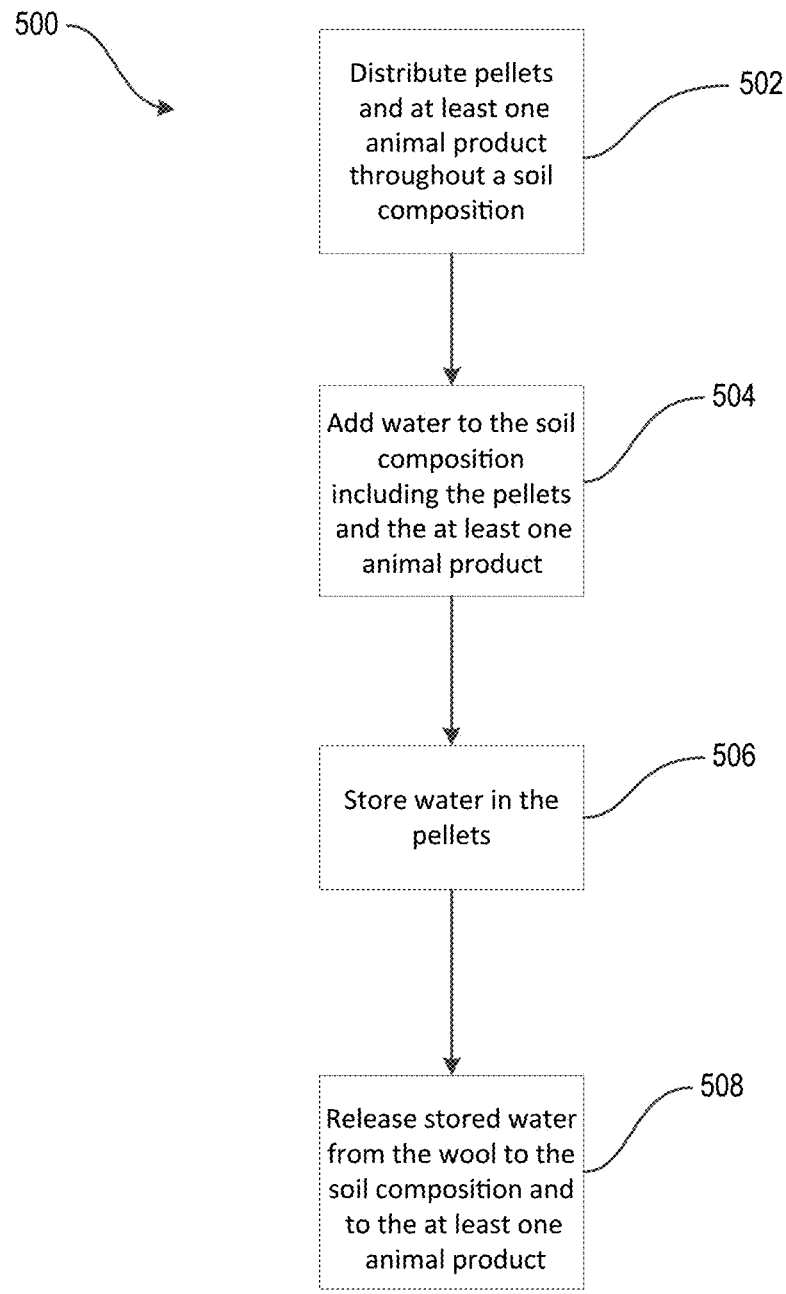
FIG. 8 is a flowchart of a method of providing water to plants with the fertilizer composition, according to an embodiment of the present disclosure.

FIG. 8 is a flowchart of a method 500 of providing water to a plant. Referring to FIGS. 1, 2, and 8 together, the method 500 may include distributing pellets 100 and at least one animal product throughout a soil composition (e.g., a fertilizer composition 202) in which a plant is to be planted or is already planted, as represented in act 502. For example, the pellets 100 and the at least one animal product may be distributed throughout a fertilizer composition 202 in a planting pot 206 or within a soil composition proximate one or more plants. The pellets 100 and the at least one animal product may be distributed to have a substantially uniform distribution within the soil composition.

The method 500 may include adding water to the soil composition including the pellets 100 and the at least one animal product, as represented in act 504. Furthermore, the method 500 may include storing water in the pellets 100, as represented in act 506. For example, water may be stored in the wool 102, since the wool 102 may absorb and retain water. Storing water in the pellets 100 may include adding water to the soil composition and pellets 100 until the pellets 100 hold (e.g., retain) a desired amount of water. In some embodiments, the pellets 100 may reach saturation (e.g., a maximum amount of water that can be absorbed) within 15 minutes of being continuously exposed to water.

In some embodiments, the pellets 100 may have a maximum capacity to hold water (e.g., an amount of water the pellets 100 are capable of absorbing and retaining). In some embodiments, the pellets 100 may have a capacity to hold an amount of water of at least about 5 times a dry weight of the pellets 100. In some embodiments, the pellets 100 may have a capacity to hold an amount of water of at least about 10 times a dry weight of the pellets 100. In some embodiments, the pellets 100 may have a capacity to hold an amount of water of at least about 15 times a dry weight of the pellets 100. In some embodiments, the pellets 100 may have a capacity to hold an amount of water of at least about 20 times a dry weight of the pellets 100. As a result, soil compositions 202 having pellets 100 distributed throughout the soil compositions may have increased capacities to hold water in comparison to traditional greenhouse soil mixes.

The method 500 may further include releasing water stored in the wool 102 to the soil composition and the at least one animal product therein, as represented in act 508. Releasing water stored in the pellets 100 to the soil composition may provide water to plants that are growing in the soil composition. Releasing water to the at least one animal product (e.g., blood meal) may solubilize at least a portion of the at least one animal product and provide nutrients from the at least one animal product to the soil composition.

In tests performed by the inventors, using pellets 100 to retain water in soil compositions and to provide water to plants showed that, over a six-day period, soil compositions having pellets 100 distributed therein retained more water than traditional greenhouse soil mixes. The tests included a first test group ("Group 1") having a soil composition 202 comprising 90% peat and 10% pellets 100 and a second test group ("Group 2") having a soil composition comprising 70% peat and 30% perlite, a traditional greenhouse soil mix. Each test group included a 7.57-liter (2.0-gallon) basket wherein the soil compositions were disposed. Each test group was watered to saturation and not watered again for the next six days. The average temperature during the trial was 22° C. The results of the tests are shown in Table II below.

TABLE II

| Group | Pre-watering weight (kg) | Weight (kg) at 1 Day | Weight (kg) at 2 Days | Weight (kg) at 3 Days | Weight (kg) at 4 Days | Weight (kg) at 5 Days | Weight (kg) at 6 days |
|---|---|---|---|---|---|---|---|
| Group 1 | 2.43 | 5.00 | 4.85 | 4.66 | 4.47 | 4.24 | 3.86 |
| Group 2 | 2.39 | 3.76 | 3.51 | 3.18 | 3.03 | 2.92 | 2.74 |

Accordingly, at the end of the six-day period, Group 2 had 0.35 kg of water remaining in the soil composition, and Group 1 had 1.43 kg of water in the soil composition 202. Put another way, Group 1 absorbed and retained over four times as much water as Group 2 over the six-day period. Furthermore, Group 1 retained over 50% of the water originally added to Group 1 over the 6-day period. In comparison, Group 2 retained only 25% of the water originally added to Group 2 over the six-day period. Significantly, the amount of water that was retained in the soil of Group 1 after six days (1.43 kg) was slightly more than the amount of water that was retained in the soil of Group 2 after only one day (1.37 kg).

By absorbing and retaining more water than traditional greenhouse soil mixes, a soil composition containing the pellets 100 may provide advantages in providing water to plants. For example, the pellets 100 may provide a more constant source of water to plants. In other words, by absorbing and retaining more water, the pellets 100 may provide a more consistent amount of water to plants over time. Providing a more consistent and constant source of water may promote plant growth and development, and may produce higher quality plants, which, in turn, may increase profits associated with growing the plants. Furthermore, growing plants in soil compositions including the pellets 100 may require less watering than growing plants in traditional greenhouse soil mixes. Moreover, there may be longer periods of time between each watering of the plants. Accordingly, water costs and labor costs may be reduced in caring for plants that are grown in soil compositions including the pellets 100. Likewise, soil compositions including the pellets 100 may lead to less plant losses or damage due to missed waterings or the soil drying out. Additionally, soil compositions 202 including the pellets 100 may enable plants to grow in more arid environments than enabled by traditional greenhouse soil mixes.

Without wishing to be bound by any particular theory, it is believed that providing the at least one animal product in combination with the pellets 100 facilitates maintaining a moisture content of the at least one animal product and solubilizing the at least one animal product in the soil composition. Stated another way, because the wool 102 of the pellets 100 releases water such that the soil composition is substantially continuously moist, nutrients from the at least one animal product are substantially continuously being absorbed by the soil composition and therefore, by plant roots proximate the soil composition.

Furthermore, by absorbing and retaining water, the pellets 100 may reduce nutrient leaching (i.e., losing water-soluble plant nutrients from soil due to rain and irrigation). By absorbing and retaining water, the pellets 100 may also absorb water-soluble plant nutrients and may protect the water-soluble nutrients from being washed out of the soil due to rain or irrigation. Furthermore, as the pellets 100 decompose, those water-soluble plant nutrients may be released and provided to the plants.

In some embodiments, when using the fertilizer composition 202 to provide water to plants, no steps may be taken that may compromise an ability to use the fertilizer composition 202 to grow plants organically according to the USDA organic regulations, as discussed above. In other words, every step taken while using the fertilizer composition 202 to provide water to plants may qualify as growing plants organically per the USDA organic regulations.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:
1. A fertilizer composition, consisting of:
   a base composition selected from the group consisting of soil, dirt, clay, sand, peat, perlite, coir, wood, wood chips, wood fiber, wheat straw, composted bark, uncomposted bark, biodigester remains, or animal manure;
   a plurality of pellets consisting of 95 percent wool by volume and 5 percent peat by volume and not including blood meal and not including an added binding agent, wherein the plurality of pellets are dispersed throughout the base composition; and
   blood meal dispersed throughout the base composition;
   wherein the fertilizer composition consists of 70 percent wool pellets by volume, and wherein the fertilizer composition consists of a concentration of about 2.94 kg/m$^3$ of the blood meal.
2. The fertilizer composition of claim 1, wherein the base composition consists of soil.
3. The fertilizer composition of claim 1, wherein the base composition consists of dirt.
4. The fertilizer composition of claim 1, wherein the base composition consists of clay.
5. The fertilizer composition of claim 1, wherein the base composition consists of sand.
6. The fertilizer composition of claim 1, wherein the base composition consists of peat.
7. The fertilizer composition of claim 1, wherein the base composition consists of perlite.
8. The fertilizer composition of claim 1, wherein the base composition consists of coir.
9. The fertilizer composition of claim 1, wherein the base composition consists of wood.
10. The fertilizer composition of claim 1, wherein the base composition consists of wood chips.
11. The fertilizer composition of claim 1, wherein the base composition consists of wood fiber.
12. The fertilizer composition of claim 1, wherein the base composition consists of wheat straw.
13. The fertilizer composition of claim 1, wherein the base composition consists of composted bark.
14. The fertilizer composition of claim 1, wherein the base composition consists of uncomposted bark.
15. The fertilizer composition of claim 1, wherein the base composition consists of biodigester remains.
16. The fertilizer composition of claim 1, wherein the base composition consists of animal manure.

* * * * *